(12) United States Patent
Yeniay et al.

(10) Patent No.: US 6,898,351 B2
(45) Date of Patent: May 24, 2005

(54) OPTICAL FIBER TRANSMISSION SYSTEMS WITH SUPPRESSED LIGHT SCATTERING

(75) Inventors: Aydin Yeniay, Phoenixville, PA (US); Renyuan Gao, Strafford, PA (US)

(73) Assignee: Photon-X, LLC, Malvern, PA (US)

( * ) Notice: Subject to any disclaimer, the term of this patent is extended or adjusted under 35 U.S.C. 154(b) by 381 days.

(21) Appl. No.: 09/877,888

(22) Filed: Jun. 8, 2001

(65) Prior Publication Data

US 2002/0081069 A1 Jun. 27, 2002

Related U.S. Application Data (60) Provisional application No. 60/246,354, filed on Nov. 7, 2000.

(51) Int. Cl.[7] .................................................. G02B 6/26
(52) U.S. Cl. .............................. 385/39; 385/10; 385/17
(58) Field of Search .............................. 385/39, 10, 15, 385/17, 31, 122, 140; 398/79; 359/327, 337

(56) References Cited

U.S. PATENT DOCUMENTS

| | | | | |
|---|---|---|---|---|
| 4,778,238 A | * | 10/1988 | Hicks ........................... | 398/92 |
| 5,023,949 A | | 6/1991 | Auracher et al. | |
| 5,039,199 A | * | 8/1991 | Mollenauer et al. ........ | 359/334 |
| 5,166,821 A | | 11/1992 | Huber | |
| 5,267,339 A | | 11/1993 | Yamauchi et al. | |
| 5,303,318 A | * | 4/1994 | Tateda et al. ................ | 385/123 |
| 5,329,396 A | | 7/1994 | Fishman et al. | |
| 5,420,868 A | | 5/1995 | Chraplyvy et al. | |
| 5,452,124 A | | 9/1995 | Baker | |
| 5,566,381 A | | 10/1996 | Korotky | |
| 5,812,712 A | | 9/1998 | Pan | |
| 5,851,259 A | | 12/1998 | Clayton et al. | |
| 5,930,024 A | | 7/1999 | Atlas | |
| 6,097,533 A | * | 8/2000 | Atlas ........................... | 359/337 |
| 6,233,090 B1 | | 5/2001 | Fukaishi | |
| 6,288,810 B1 | * | 9/2001 | Grasso et al. ................... | 398/9 |
| 6,335,941 B1 | * | 1/2002 | Grubb et al. ................... | 372/6 |
| 6,374,006 B1 | * | 4/2002 | Islam et al. .................... | 385/15 |
| 6,449,408 B1 | * | 9/2002 | Evans et al. .................... | 385/27 |
| 6,501,870 B1 | * | 12/2002 | Banerjee et al. ............... | 385/24 |
| 6,535,328 B2 | * | 3/2003 | Yao ............................. | 359/334 |
| 6,538,788 B2 | * | 3/2003 | Franco et al. ................ | 398/158 |
| 6,542,228 B1 | * | 4/2003 | Hartog ....................... | 356/73.1 |

FOREIGN PATENT DOCUMENTS

| | | | | |
|---|---|---|---|---|
| EP | 789432 A1 | 8/1997 | | |
| EP | 930732 A1 | 7/1999 | | |
| GB | 2140554 A | * 11/1984 | ........... | G01K/11/00 |
| JP | 56133818 | 2/1983 | | |
| JP | 06189672 | 2/1996 | | |
| WO | WO 9805133 A1 | * 2/1998 | ......... | H04B/10/213 |
| WO | WO 98/42050 A1 | 9/1998 | | |

OTHER PUBLICATIONS

Cotter, "Stimulated Brillouin Scattering in Monomode Optical Fiber", Journal of Optical Communications, Jan. 1983, Fachverlag Schiele & Schon pp 10–19.

(Continued)

*Primary Examiner*—Frank G. Font
*Assistant Examiner*—K. Cyrus Kianni
(74) *Attorney, Agent, or Firm*—Joseph E. Maenner; Monte & McGraw, P.C.

(57) ABSTRACT

A system and method for suppressing light scattering in optical fiber transmission systems are disclosed. The system includes an optical fiber assembly having first and second ends and at least one blocking apparatus disposed along the fiber between the first and second ends. The method includes providing a fiber assembly having a first end and a second end; installing a blocking apparatus in the fiber assembly between the first end and the second end; and transmitting light between the first end and the second end. The fiber assembly generates Brillouin and Rayleigh scattering light in a direction opposite the direction of the transmitted light, and the blocking apparatus suppresses the Brillouin and Rayleigh scattering light.

1 Claim, 9 Drawing Sheets

OTHER PUBLICATIONS

Takushima et al, "Suppression of Simulated Brillouin Scattering Using Optical Isolators", Electronics Letters, Jun. 4, 1992, vol. 28, No. 12, pp 1155–1157.

Written Opinion for PCT/US 01/42893, International Filing Date Jul. 11, 2000, Date of Mailing Jan. 16, 2003.

Search Report for PCT/US 01/42893, International Filing Date Feb. 11, 2001, Date of Mailing Sep. 19, 2002.

A. Yeniay et al., "Polarization Multiplexing Technique for SBS Suppression." [Conference Paper] ECOC'2000. European Conference on Optical communication, Section 1, ID348, Sep. 4, 2000, Munich, Germany.

P.C. Becker et al., "Erbium–Doped Fiber Amplifiers—Fundamentals and Technology", Academic Press, pp 52–59, 1999.

C. Headley et al., "Technique for Obtaining a 2.5 dB Increase in the Stimulated Brillouin Scattering Threshold of Ge–doped Fibers by Varying Fiber Draw Tension", OFC 97 Technical Digest, WL25.

M. M. Howerton et al., "SBS Suppression Using a Depolarized Source for High Power Applications", J. of Lightwave Tech, vol. 14, no3, pp. 417–422, Mar. 1996.

K. Shiraki et al., "SBS Threshold of a Fiber with a Brillouin Frequency Shift Distribution", Journal of Lightwave Tech., vol. 14, No. 1, pp. 50–57, Jan. 1996.

S. K. Korotky et al., "Efficient Phase Modulation Scheme for Suppressing Stimulated Brillouin Scattering", IOOC'95, WD2–1, Hong Kong 1995.

M. M. Howerton et al., "Depolarized Sourde for High Power Remote Operation of an Integrated Optical Modulator", IEEE Photonics Technology Letters, vol. 6, No. 1, Jan. 1994.

M. Ohashi et al., "Design of Strain–Free–Fiber with Nonuniform Dopant Concentration for SBS Suppression", Journal of Lightwave Tech., vol. 11, No. 12, pp. 1941–1945, Dec. 1993.

N. Yoshizawa et al., "Stimulated Brillouin Scattering Suppression by Means of Applying Strain Distribution to Fiber with Cabling", Journal of Lightwave Tech., vol. 11, No. 10, pp. 1518–1522, Oct. 1993.

X. P. Mao et al., "Brillouin Scattering in externally Modulated Lightwave AM–VSP CATV Transmission Systems", IEEE Photonics Tech. Lett., vol. 4, No. 3, pp. 287–290, Mar. 1992.

X. P. Mao et al., "Stimulated Brillouin Threshold Dependence on Fiber Type and Uniformity", IEEE Photonics Technology Letters, vol. 4, No. 1, pp. 66–69, Jan. 1992.

Y. Aoki et al., "Input Power Limits of Single–mode Optical Fibers Due to Stimulated Brillouin Scattering in Optical Communication Systems", J. of Lightwave Tech, vol. 6, No 5, pp. 710–718, May 1988.

* cited by examiner

Calculated effective length of the Fiber in terms of the physical length for various propagation losses at 1550 nm.

OPTICAL FIBER TRANSMISSION SYSTEMS WITH SUPPRESSED LIGHT SCATTERING

CROSS-REFERENCE TO RELATED APPLICATION

This application claims the benefit of U.S. Provisional Application No. 60/246,354, filed Nov. 7, 2000.

FIELD OF THE INVENTION

The present invention relates to optical fiber communication, including uni-directional cable TV systems, and uni- and bi-directional wavelength division multiplexing (WDM) systems. The invention also relates to a method and apparatus design for suppressing stimulated Brillouin and Rayleigh scattering in these systems.

BACKGROUND OF THE INVENTION

In long distance optical transmission systems, it is desirable to launch the highest optical power possible into the transmission fiber link. High power enables the signals to be transmitted over longer distances without the need for additional components such as regenerators, repeaters, and amplifiers, which increase the cost of communication systems. However, with the higher optical launch power, optical fibers exhibit non-linear effects such as stimulated Brillouin scattering (SBS), four-wave mixing (FWM), stimulated Raman scattering (SRS) and self phase modulation (SPM). These non-linear optical effects, whose magnitude depend on the non-linear optical coefficients of the fiber material, fiber length (L) and the laser signal linewidth ($\Delta v$), limit the amount of useable launch power into the communication system. These phenomena can degrade the optical signals and increase bit error rates (BERs) for the data transmitted by the system.

The power of the optical signal is also a factor in determining the severity of these non-linear effects. Since the optical power is concentrated into a smaller cross section area in optical fibers, a modest optical power level can produce these nonlinear effects. Among the non-linear effects described above, SBS occurs at the lowest inserted power level in fiber communication systems, commonly using commercial semiconductor distributed feedback (DFB) lasers having narrow linewidths (~1 MHz). Thus, SBS has been considered as setting a limit on the launched power level in optical fiber systems. The threshold for this effect is on the order of a few milliwatts of optical power for typical single mode optical fibers; below this threshold power, the scattering is a spontaneous process and the scattered light intensity is so low that signal degradation is minimal.

The primary origin of the SBS phenomenon is acousto-optic fluctuations via electrostriction. The pump wave generates acoustic waves through the process of electrostriction. Electrostriction is the tendency of material to compress in the presence of an electrical field. In turn, electrostriction causes a periodic modulation of the fiber refractive index in the form of an optical grating. This pump-induced refractive index grating scatters the signal light through Bragg diffraction. In optical fibers, the SBS travels in a backward direction and is shifted in frequency proportional to both the sound velocity and refractive index of the fiber. The frequency shift, commonly referred to as the Brillouin shift, is given by:

$$v_B = \frac{2nV_A}{\lambda_p}, \quad \text{Equation (1)}$$

where $\lambda_p$, n, $V_A$ are the wavelength of the incident pump, the refractive index of the core and the sound velocity of the material, respectively.

The SBS threshold power $P^{thr}$ is given by:

$$P^{thr} \cong \frac{21 A_{\mathit{eff}}}{g_B L_{\mathit{eff}}}\left(1 + \frac{\Delta v_P}{\Delta v_B}\right) \quad \text{Equation (2)}$$

$$L_{\mathit{eff}} = \frac{1}{\alpha}[1 - e^{-\alpha L}] \quad \text{Equation (3)}$$

where $\Delta v_p$ is the input laser linewidth, $\Delta v_B$ is Brillouin linewidth, $A_{\mathit{eff}}$ is the effective core area, $L_{\mathit{eff}}$ is the effective length, and $g_B$ is the Brillouin gain of the fiber medium. Additionally, Rayleigh scattering, whose origin is non-propagating density fluctuations, occurs in a backward direction, but the scattering intensity is lower than that of SBS.

For a given length of a fiber, the SBS threshold depends mostly on the linewidth of the laser source and Brillouin linewidth of the medium. The Brillouin linewidth is the linewidth of the backscattered Brillouin light in the frequency domain and is inversely proportional to the acoustic phonon lifetime in the medium.

Figure 1:
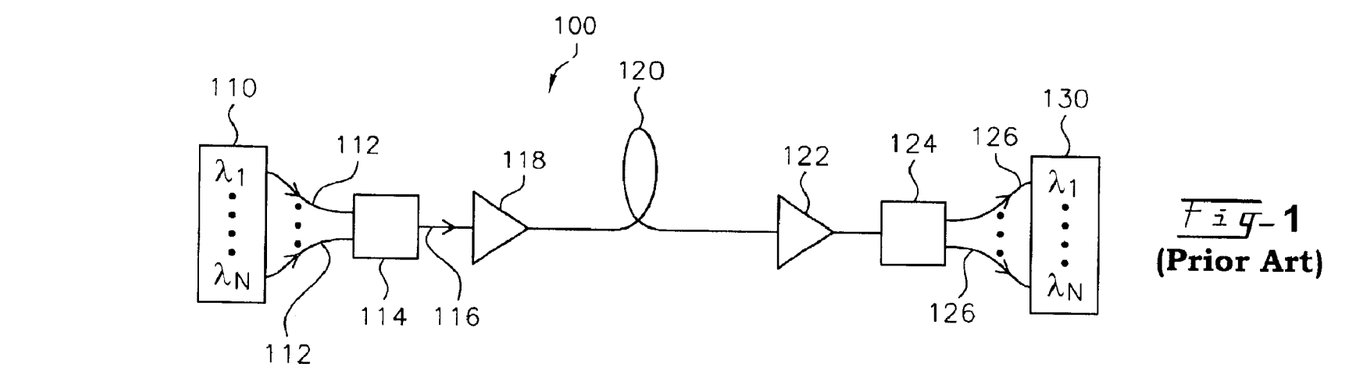
FIG. 1 shows a schematic diagram of a prior art uni-directional wavelength division multiplexing system without an SBS suppression system.

A known uni-directional WDM fiber optic transmission system 100 without any SBS suppression is shown schematically in FIG. 1. A transmitter 110 generates light signals of multiple wavelengths ($\lambda_1 \ldots \lambda_N$) along multiple fibers 112 to a first WDM 114, which allows the multiple wavelengths to travel along a single fiber 116. A booster amp 118 is disposed downstream of the first WDM 114 to amplify the transmitted signal prior to transmission along a fiber 120. Proximate the end of the transmission fiber 120, the signal is transmitted through a pre-amp 122 prior to transmission to a second WDM 124, which splits the multiple wavelengths ($\lambda_1 \ldots \lambda_N$) into individual fibers 126 for transmission to a receiver 130. SBS is generated along the fiber 120 and propagates backward, toward the transmitter 110, causing undesirable noise in the system, which degrades the light signals being transmitted from the transmitter 110 to the receiver 130.

Figure 2:
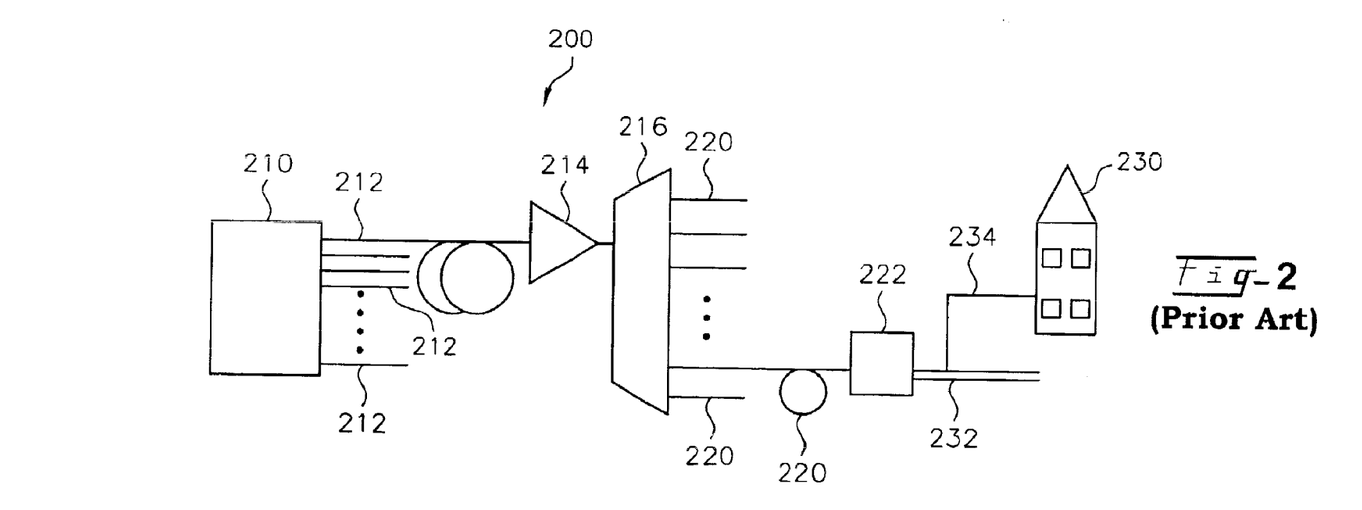
FIG. 2 shows a schematic diagram of a prior art uni-directional fiber-coax hybrid CATV transmission system without an SBS suppression system.

FIG. 2 schematically shows an application of a unidirectional system, in a community antenna television (CATV) system 200. An optical signal is generated at a head end 210 and transmitted along a plurality of optical fibers 212 to fiber amplifiers 214 (only one fiber amplifier 214 is shown). A splitter 216 divides the optical signal for transmission along multiple optical fibers 220. Each optical fiber 220 terminates in a fiber node 222 (only one shown for clarity) proximate to an end destination, such as a residence 230. The fiber node 222 converts the optical signal to an electrical signal for transmission along an electrical bus 232, where individual coaxial cables 234 transmit the signal to the residence 230. Without SBS suppression, the fiber launch powers in typical single mode fiber (e.g. SMF-28) are limited by SBS. The upper limit of the optical power in a typical fiber optic CATV system 200 without SBS suppression is, for example, approximately +17 dBm (approximately 50 mW) for a 50 km single mode fiber.

Figure 3:
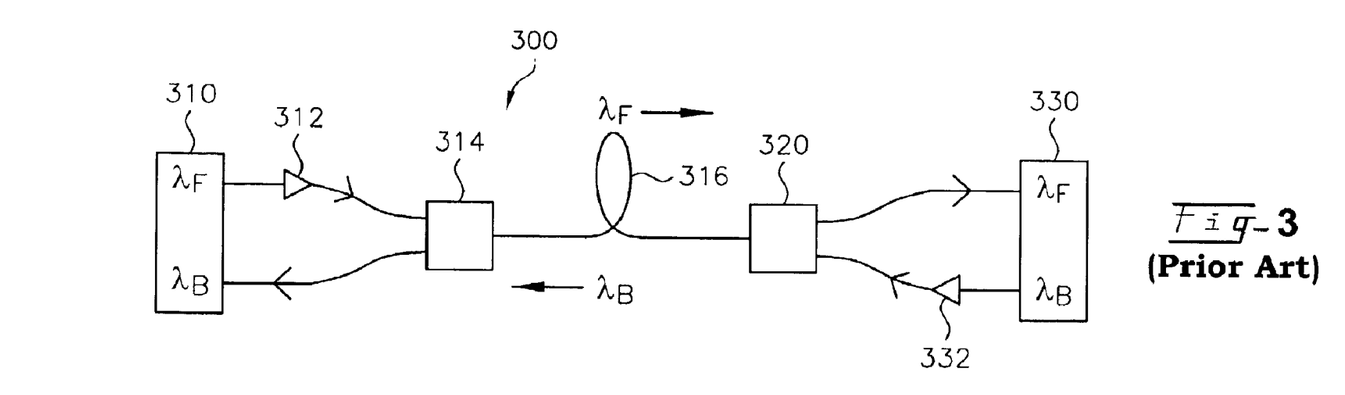
FIG. 3 shows a schematic diagram of a prior art bi-directional wavelength division multiplexing system without an SBS suppression system.

A prior art bi-directional fiber optic transmission system 300 without any SBS suppression is shown schematically in FIG. 3. A first transmitter/receiver 310 transmits a first light signal having a wavelength $\lambda_F$ from left to right, through an amplifier 312, to a first WDM 314, along a fiber 316 to a second WDM 320 and to a second transmitter/receiver 330. Simultaneously, the second transmitter/receiver 330 transmits a second light signal having a wavelength $\lambda_B$ from right to left, through an amplifier 332, to the second WDM 320, along the fiber 316 to the first WDM 314 and to the first transmitter/receiver 310. The first light signal generates SBS, which travels from right to left and interferes with the second light signal, and the second light signal generates SBS, which travels from left to right and interferes with the first light signal.

To improve upon transmission quality in the systems shown in FIGS. 1–3, several techniques have been demonstrated to suppress SBS in optical transmission systems. Basically, these techniques can be put into two main groups in terms of their approach to the problem. One approach to suppress SBS is based on broadening the laser linewidth via either frequency modulation (FM) or phase modulation (PM). As seen from Eq. (2), broadening the laser linewidth results in a higher SBS threshold. Both direct FM and external PM, which both introduce a predetermined amount of spectral broadening to the laser, have been demonstrated as effective means of suppressing SBS in optical systems.

The direct FM approach uses a dither signal on the laser bias to provide large frequency excursions, usually on the order of 10 GHz. By means of this technique, the SBS threshold has been increased by as much as 15 dB, as disclosed in U.S. Pat. No. 5,329,396 (Fishman et al.). However, direct FM of an injection laser also results in substantial AM, called residual AM, which degrades the system performance, especially for analog transmission systems.

By contrast, the external PM approach avoids the production of the residual amplitude modulation while still suppressing SBS. U.S. Pat. No. 5,566,381 (Korotky et. al.) discloses a 17 dB increase in the SBS threshold by PM modulation of the laser with more than one radio frequency (RF) source. However, in optical transmission systems, this external PM technique typically degrades the dispersion characteristics of the signal due to an excessive increase in linewidth of the laser source.

Figure 4:
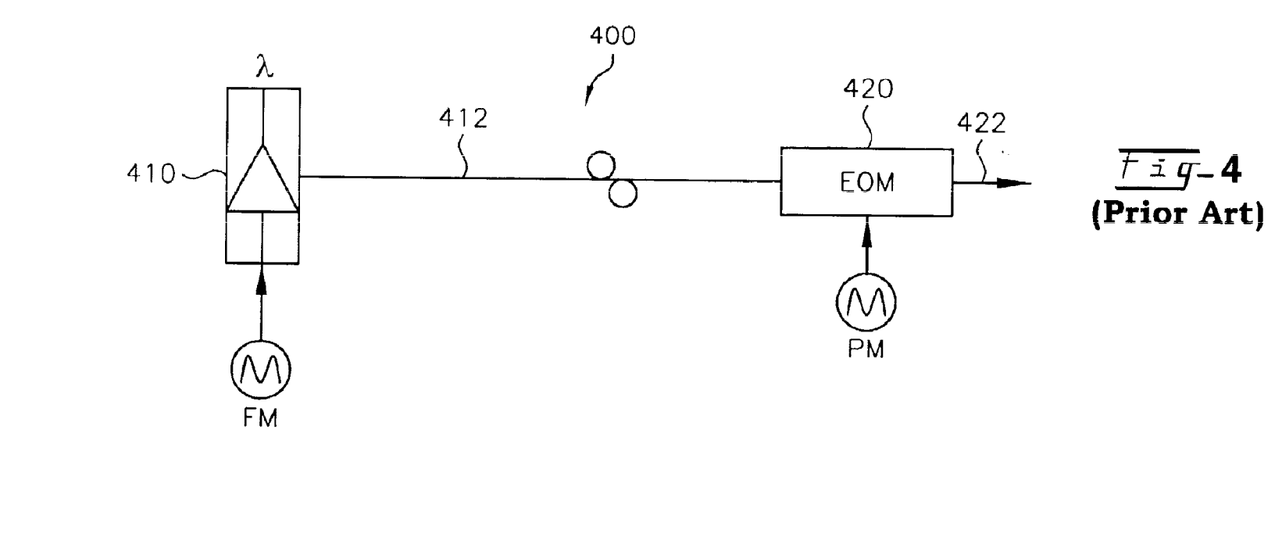
FIG. 4 shows a schematic diagram of a prior art known method to suppress SBS by increasing the laser linewidth via FM or PM.

FIG. 4 shows a schematic diagram of prior art system 400 to suppress SBS. These techniques are based on either a direct frequency modulation of a laser driver, or an external phase modulation of a laser signal. The laser can be a conventional solid-state laser (e.g. DFB) with a wavelength preferably chosen in either optical communication window (1300 nm or 1550 nm). Optical communication windows are wavelengths at which signal losses are minimized. Both techniques provide the linewidth broadening of the laser source. Broadening the optical linewidth of the laser reduces the spectral density of the signal. Thus, the same optical power becomes distributed over a broader range of spectrum, and the SBS threshold increases depending on the broadening ratio. Both direct FM and external PM, which both introduce a predetermined amount of spectral broadening to the laser, have been demonstrated as effective means of suppressing the SBS in optical systems. On the other hand, the external PM approach avoids the production of residual amplitude modulation and also suppresses SBS.

As shown in FIG. 4, a laser 410 transmits an optical signal along a fiber 412. The optical signal is injected into a Mach-Zehnder electro optic modulator (EOM) 420, which modulates the optical signal. The EOM420 has two arms, with one arm having a LiNbO$_3$ crystal which is driven by an electrical signal to generate a phase difference between the two arms. When a phase difference, such as $\pi$, is present, the optical signal is blocked and cannot travel through the EOM 420. When no phase difference is present, the optical signal can pass through the EOM 420. The EOM 420, which is driven by an RF signal, provides the PM at the output 422. The linewidth broadening is proportional to the frequency and modulation index of the RF signal. It has been disclosed in U.S. Pat. No. 5,166,821 (Huber) and U.S. Pat. No. 5,420,868 (Chraplyvy et al.), that the SBS threshold can be increased by 5 dB by using a similar optical phase modulator driven with a single frequency sinusoidal signal. But, increasing the SBS threshold further requires a high modulation index, which also requires very high RF drive power. Recently, PM modulation of a laser with more than one RF driver has been shown to provide more linewidth broadening and, therefore, further SBS suppression. Korotky discloses that modulation of a DFB laser signal by means of an EOM, which is driven with four frequencies (70, 245, 858, and 3001 MHz) and a total RF power of 250 mW, may provide a 17 dB increase in the SBS threshold. However, in optical transmission systems, this external PM technique typically results in degrading the dispersion characteristics of the propagating optical signal due to the excessive increase in linewidth of the laser source. Another approach to suppress SBS is based on the modification of the fiber medium properties along the longitudinal direction of the fiber. As noted earlier above, the Brillouin shift is dependent on the medium properties such as refractive index and sound velocity. The parameters that influence the refractive index and the sound velocity in turn are composition of the glass, residual fiber stress, density of the fiber core, and temperature. In order to provide a high SBS threshold, these parameters should be altered in a distributed manner through the fiber.

Figure 5:
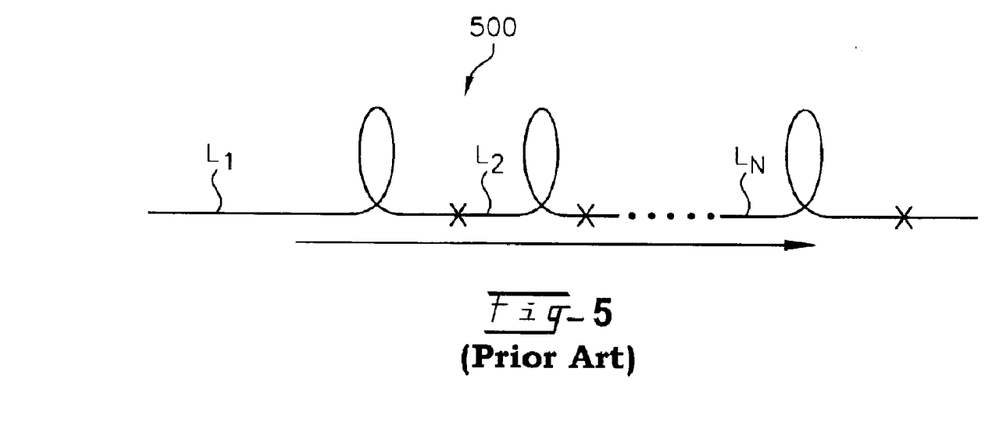
FIG. 5 shows a schematic of another known method to suppress SBS by employing various lengths of fibers with different material properties that produce different Brillouin shift frequencies.

FIG. 5 shows a schematic of a fiber 500 which represents the method described above by employing various lengths of fibers $L_1, L_2, \ldots L_N$ with different material properties $v_{B1}$, $v_{B2}, \ldots v_{BN}$, respectively, or by continuously modifying the fiber properties of a single fiber that produce different Brillouin shift frequencies. Thus, the resultant Brillouin spectrum of the fiber 500 contains various frequency components without overlapping each other, which provides a Brillouin gain within a broad bandwidth and results in higher SBS threshold. Thus, the Brillouin gain profile would vary along the fiber 500, which avoids the accumulation of the gain within a small bandwidth and results in a broader gain profile and higher SBS threshold. However, this approach is not practical because of the difficulty in manufacturing such fibers and the lack of use in already installed optical fiber systems.

BRIEF SUMMARY OF THE INVENTION

Briefly, the present invention provides a method of suppressing Brillouin scattering light in an optical fiber. The method comprises providing a fiber assembly having a first end and a second end; installing a blocking apparatus in the fiber assembly between the first end and the second end; and transmitting light between the first end and the second end, the fiber assembly generating Brillouin scattering light in a direction opposite a direction of the transmitted light, the blocking apparatus suppressing the Brillouin scattering light.

Additionally, the present invention provides a system for suppressing Brillouin scattering light in an optical fiber. The system comprises an optical fiber having first and second ends and at least one blocking apparatus disposed along the fiber between the first and second ends.

Further, the present invention provides a method of optimizing a location of a blocking apparatus in an optical fiber system. The method comprises providing a first device and a second device; providing a fiber between the first device and the second device, the fiber having a predetermined length; determining the effective length of the fiber based on the predetermined length; and installing the blocking apparatus at the effective length of the fiber.

Also, the present invention provides a method of installing a blocking apparatus in an existing fiber optic system having a first location and a second location. The method comprises measuring a length of fiber between the first location and the second location; determining the effective length of the fiber based on the measured length of the fiber; and installing a blocking apparatus in the fiber at the effective length.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the futures of the invention. In the drawings.

DETAILED DESCRIPTION OF THE INVENTION

The present invention is an alternative to the prior art SBS approaches described above. Alternatively, the present invention can be used in combination with any of the previously described prior art techniques, or other SBS suppression techniques not described to obtain further SBS suppression.

In accordance with the present invention, SBS is blocked in a distributed manner via blocking apparatuses (i.e. isolator, circulator, filter, fiber grating) in order to avoid accumulation of the Brillouin light that leads to the stimulated process.

As an application of the present invention in both uni-directional and bi-directional transmission systems, at least one, and preferably, a plurality of blocking apparatuses are placed along the fiber length. The number of blocking apparatuses and the spacing between them can be optimized by taking into account of the effective fiber length dependence of the SBS threshold. The procedure for estimating the required effective fiber length will be given below. For the uni-directional transmission system, isolators are sufficient as blocking apparatuses. For bi-directional transmission systems, blocking systems such as isolators, circulator and filter assemblies, or circulator and fiber grating assemblies are placed along the fiber length.

Figure 6:
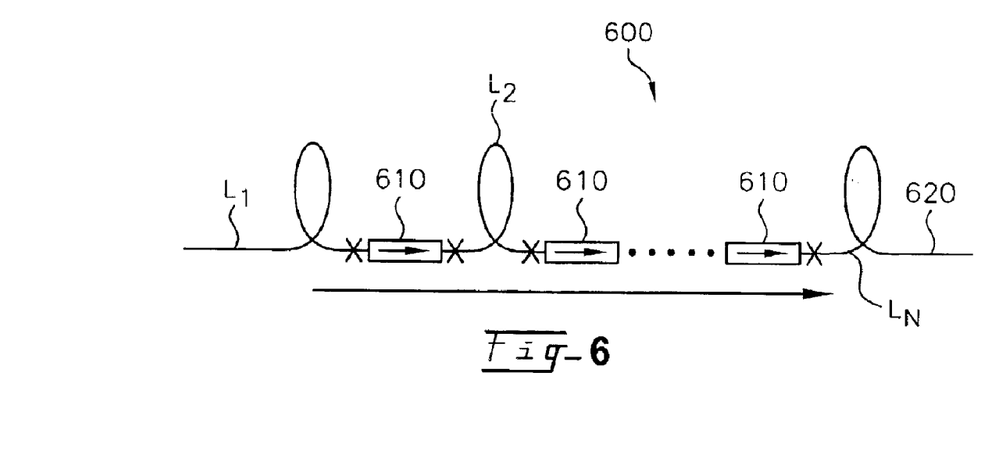
FIG. 6 shows a schematic diagram of a uni-directional transmission system incorporating a series of optical blocking apparatuses distributed along the fiber.

FIG. 6 shows a schematic diagram of the uni-directional transmission system 600 incorporating a series of blocking apparatuses 610, such as optical isolators, distributed along a fiber assembly 620. While SBS occurs in backward direction in a distributed manner in optical fibers, SBS is also shifted in frequency. The amount of the shift is on the order of ~10 GHz for 1550 nm laser light in silica glass fiber. Since the Brillouin scattering is a distributed process, contribution to the Brillouin light intensity comes from each region $L_1, L_2, \ldots, L_N$ along the length of the fiber assembly 620. The amount of the contribution from each region is proportional to the input light intensity at that region.

With the present invention, the backscattered light is blocked with the blocking apparatus 610 to avoid the accumulation of the Brillouin light. After each blockage, the fiber assembly 620 behaves like a separate medium without having any Brillouin light contribution from the previous section of the fiber assembly 620. In the uni-directional system, the blocking apparatus 610 is preferably an optical isolator, which enables the light to pass only in the forward direction. These isolators are readily available and can exhibit as low as approximately 0.6 dB insertion loss and isolation of >35 dB. Also, other blocking apparatuses 610 such as filters or fiber gratings can be used for uni-directional transmission systems. However, the filter or fiber grating must have a very narrow bandwidth to isolate only the Brillouin light from the input signal. Also, the filter or fiber grating must preferably have a low insertion loss to minimize optical signal losses during transmission.

Figure 7:
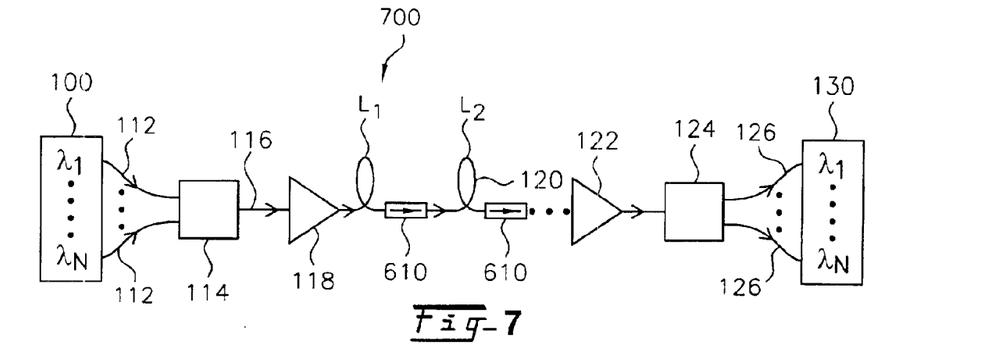
FIG. 7 shows a schematic diagram of the uni-directional wavelength division multiplexing system of FIG. 1 with the SBS suppression system of FIG. 6.
Figure 8:
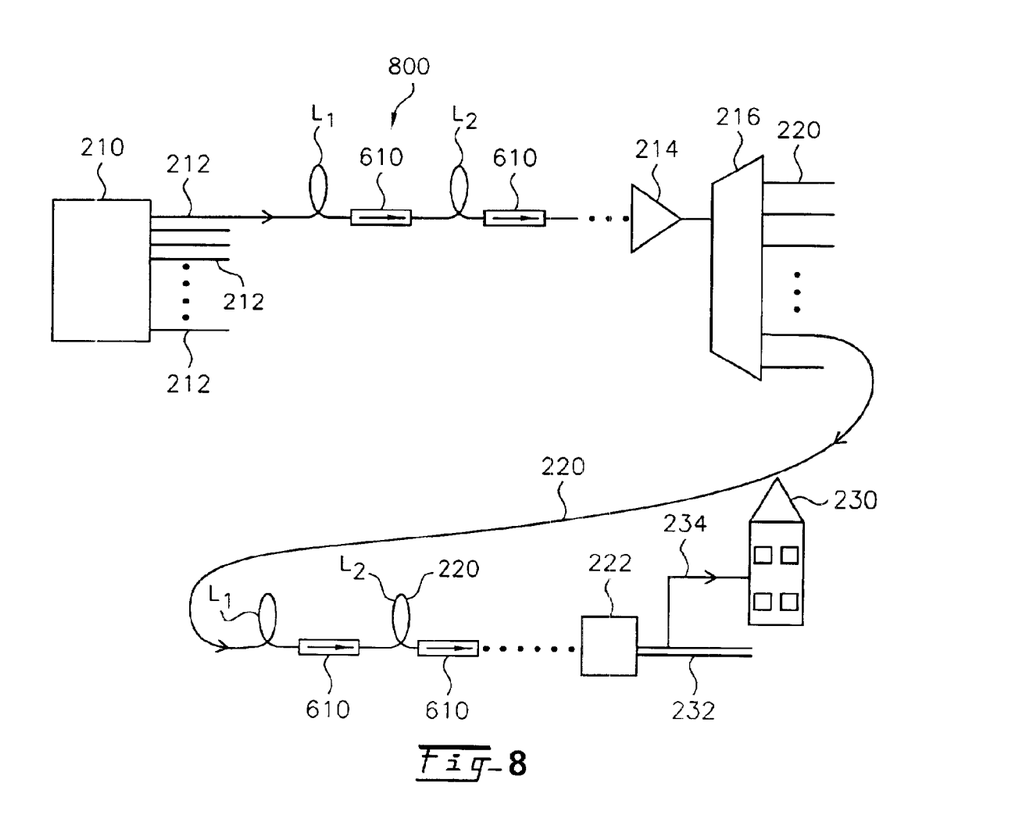
FIG. 8 shows a schematic diagram of the fiber-coax hybrid CATV transmission system of FIG. 2 with the SBS suppression of FIG. 6.

The blocking apparatus 610 can also be inserted into the system 100 of FIG. 1 to form an improved system 700 shown in FIG. 7. Similarly, the blocking apparatus 610 can also be inserted into the CATV system 200 of FIG. 2 to form an improved CATV system 800 shown in FIG. 8. As shown in FIG. 8, at least one blocking apparatus 610 can be installed in the optical fiber 212, 220 upstream of the fiber node 222, allowing for greater distances between the head end 210 and the fiber node 222 without degradation of the light signal. Because the CATV system 800 uses blocking apparatuses 610, the SBS threshold and the transmission power capacity of the system 800 can be increased, thus enhancing the system capacity and design flexibility.

In the general case of (i) blocking apparatuses 610 distributed along the fiber dividing the fiber into (i+1) sections, it can be shown that for fiber with low attenuation and densely inserted blocking apparatuses 610, the optimum positions of the blocking apparatuses 610 are such that the blocking apparatuses 610 are approximately equally spaced. In such cases, the SBS suppression ratio is approximately equal to the number of fiber sections and the SBS suppression (in dB) is approximately equal to:

$$S=10[\log(i+1)], \quad \text{Equation (4)}$$

where S is the suppression and i is the number of fiber sections $L_N$ in the fiber.

In the SBS suppressed system, as shown in FIG. 8, the input power limit is increased from, for example, 17 dBm (without suppression) to $(17+10[\log(i+1)])$ dBm (with suppression), where i is the number of blocking apparatuses 610 inserted into the fiber 212, 220 which links the head end 210 to the fiber node 222.

Figure 9:
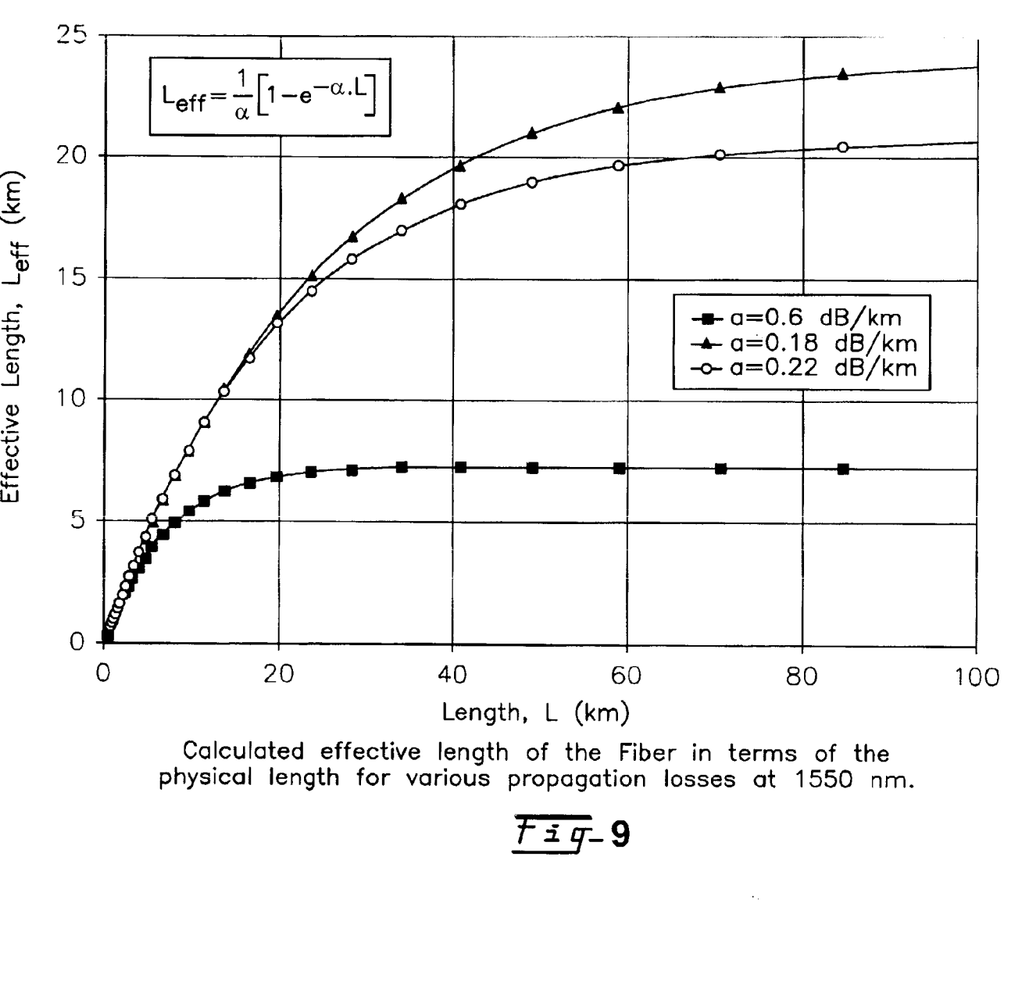
FIG. 9 shows the effective fiber length dependence on the physical fiber length for various attenuation values.

The number of blocking apparatuses 610 and the spacing between them can be optimized by taking into account of the effective length dependence of the SBS threshold. As an example, Equation (3) calculates the effective length of fiber for a single isolator employed in a system consisting of a single mode optical fiber. The graph in FIG. 9 shows the effective fiber length dependence on the physical fiber length for various attenuation values.

Figure 10:
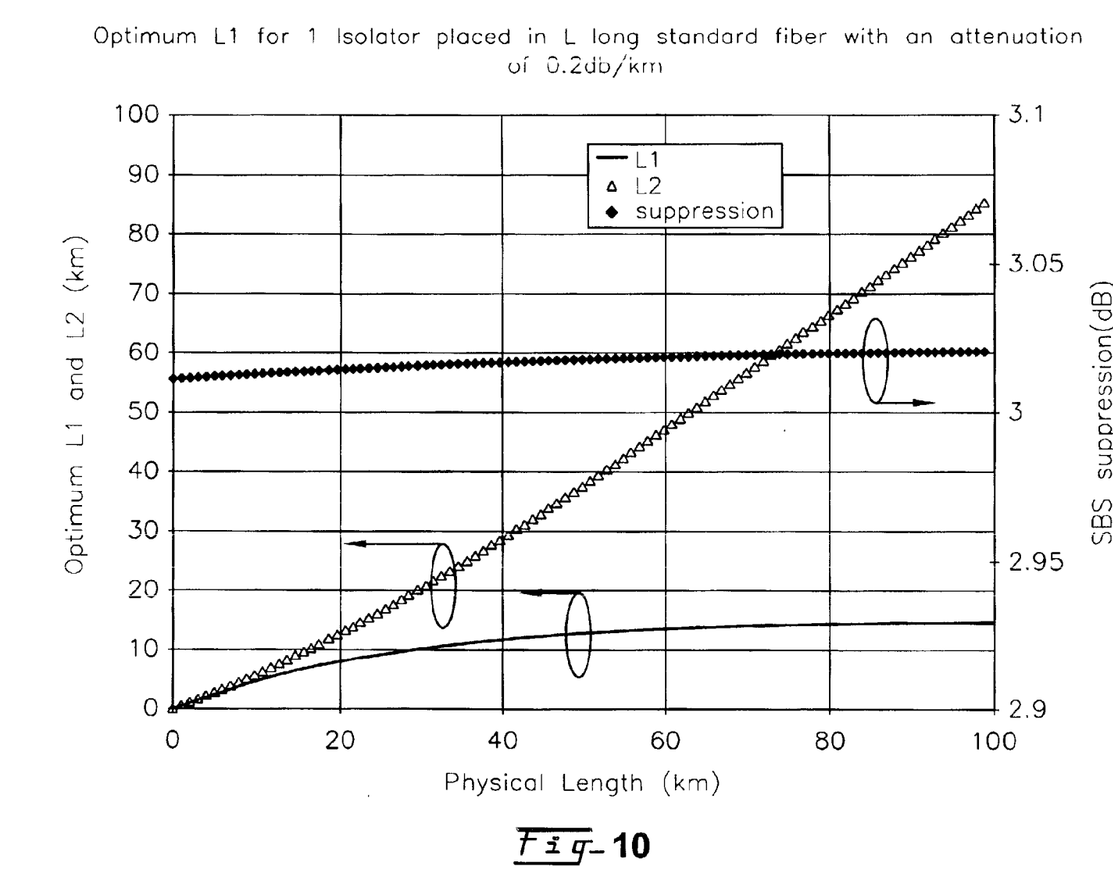
FIG. 10 shows the calculated optimum position of a single blocking apparatus and SBS suppression vs. total length of the fiber for a standard fiber with an attenuation of 0.2 db/km.

FIG. 10 shows the calculated optimum position of a single blocking apparatus and SBS suppression ratio "S" vs. total length of a fiber for a standard fiber with an attenuation of 0.2 db/km. The optimal position for the blocking apparatus is determined by taking into account of the fiber length L, the attenuation coefficient of the fiber $\alpha_{dB}$ and the insertion loss of the blocking apparatus $\xi_{dB}$:

$$L_{1/2}^{optimal} = \frac{4.343}{\alpha_{dB}} \ln\left[\frac{e^{-\frac{\xi_{dB}}{4.343}} + 1}{1 + e^{-\frac{\xi_{dB}}{4.343}} e^{-\frac{L\alpha_{dB}}{4.343}}}\right] \quad \text{Equation (5)}$$

where $L_{1/2}^{optimal}$ is the optimal length of the first section of the fiber $L_{1/2}$.

When the blocking apparatus loss is sufficiently small to be neglected, Equation (5) will then reduce to:

$$L_{1/2}^{optimal} = \frac{4.343}{\alpha_{dB}} \ln\left[\frac{2}{1 + e^{-\frac{L\alpha_{dB}}{4.343}}}\right] \quad \text{Equation (6)}$$

As shown in FIG. 10, for a fiber having a short length or small attenuation, the optimum position of the blocking apparatus is located at approximately 50% of the fiber length. However, the optimum position decreases as the total fiber length increases, becoming 29.2%, 22.4%, 17.8%, and 14.5% for total fiber lengths of 40 km, 60 km, 80 km, and 100 km, respectively. Also shown in FIG. 10, for lengths of fiber between 0 and 100 km long with one blocking apparatus 50, the suppression is approximately 3 dB.

For the case of (n-1) blocking apparatuses 50 dividing a fiber with total length of L into n sections, the optimal points to insert the blocking apparatuses 610 are at $l_n$, where $l_n$'s satisfy the following set of equations:

$$E_n = e^{-l_n \alpha_{dB}/4.343} \quad \text{Equation (7)}$$

$$E_1 = \frac{1 - E_1}{2 - E_2} \quad \text{Equation (7.1)}$$

$$E_2 = \frac{1 - E_2}{2 - E_3} \quad \text{Equation (7.2)}$$

$$E_3 = \frac{1 - E_3}{2 - E_4} \quad \text{Equation (7.3)}$$

$$\vdots$$

$$E_{n-1} = \frac{1 - E_{n-1}}{2 - E_n} \quad \text{Equation (7.n-1)}$$

$$E_n = e^{-L\alpha} \cdot (E_1 E_2 \cdots E_{n-1})^{-1} \quad \text{Equation (7.n)}$$

It is straightforward to solve Equation (6) for any n value. As an example, when n=3, $$E_1 = \frac{2 + e^{-L\alpha}}{3} \quad \text{Equation (8.1)}$$

$$E_2 = \frac{1 + 2e^{-L\alpha}}{2 + e^{-L\alpha}} \quad \text{Equation (8.2)}$$

$$E_3 = \frac{3e^{-L\alpha}}{1 + 2e^{-L\alpha}} \quad \text{Equation (8.3)}$$

The optimum lengths $L_{1/3}$, $L_{2/3}$, $L_{3/3}$ divided by two blocking apparatuses 50 are thus:

$$L_{1/3} = \left(\ln\frac{3}{2 + e^{-\frac{L\alpha}{4.343}}}\right)\frac{4.343}{\alpha_{dB}} \quad \text{Equation (9.1)}$$

$$L_{2/3} = \left(\ln\frac{2 + e^{-\frac{L\alpha}{4.343}}}{1 + 2e^{-\frac{L\alpha}{4.343}}}\right)\frac{4.343}{\alpha_{dB}} \quad \text{Equation (9.2)}$$

$$L_{3/3} = \left(\ln\frac{1 + 2e^{-\frac{L\alpha}{4.343}}}{3e^{-\frac{L\alpha}{4.343}}}\right)\frac{4.343}{\alpha_{dB}} \quad \text{Equation (9.3)}$$

Figure 11:
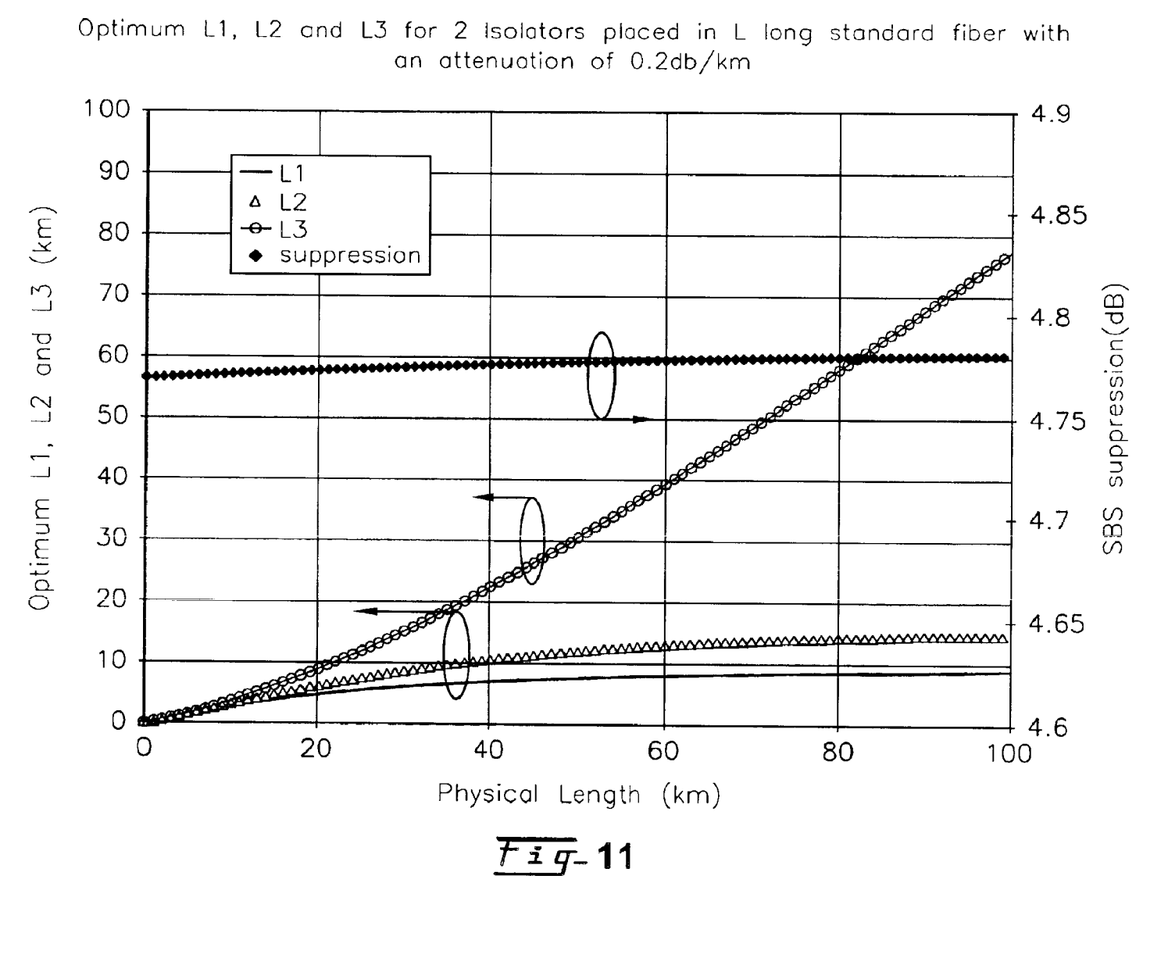
FIG. 11 shows the calculated optimum positions of two blocking apparatuses and SBS suppression vs. total length of the fiber for a standard fiber with an attenuation of 0.2 dB/km.

FIG. 11 shows the optimal lengths $L_{1/3}$, $L_{2/3}$, $L_{3/3}$ as a function of the total fiber length. For short fiber length or low fiber attenuation coefficient, $L_{1/3} \approx L_{2/3} \approx L_{3/3}$, indicating near equal spacing of blocking apparatuses along the fiber.

Figure 12:
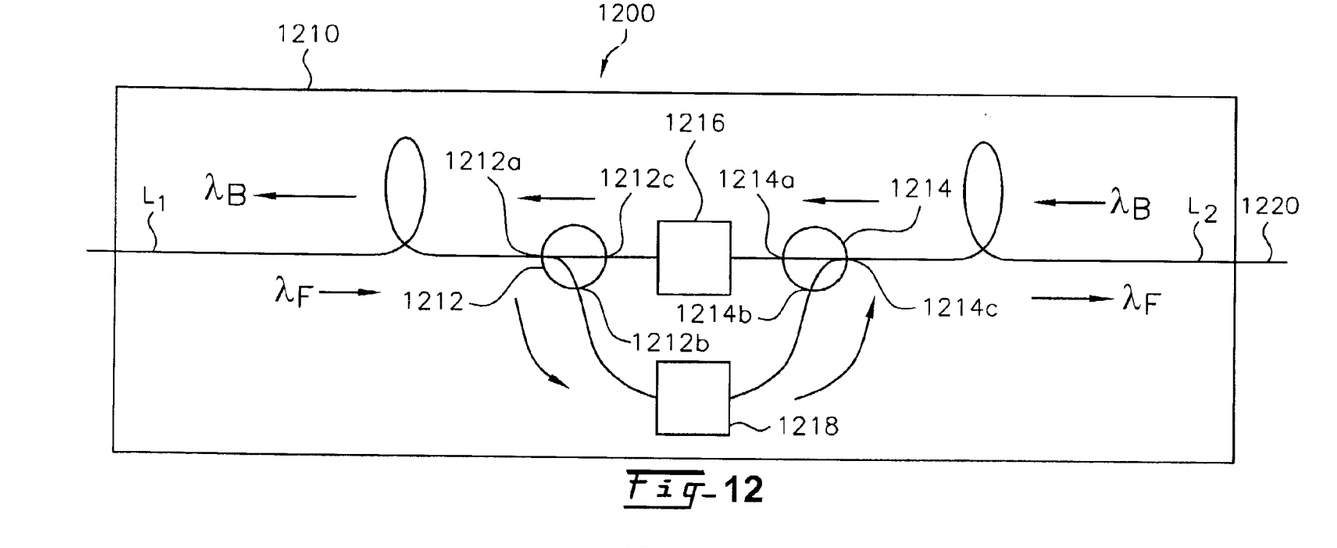
FIG. 12 shows a schematic diagram of a bi-directional transmission system incorporating a blocking apparatus distributed along the fiber.

Whereas FIG. 6 shows a schematic diagram for suppressing SBS scattering for unidirectional transmission systems, FIG. 12 shows a schematic diagram of a bi-directional transmission system 1200 that incorporates a series of bi-directional blocking systems 1210 distributed along a fiber 1220 (only one blocking system 1210 shown for clarity). The blocking system 1210 is comprised of two circulators 1212, 1214 and blocking apparatuses 1216, 1218 such as filters or fiber gratings. The blocking system 1210 is disposed between two fiber lengths $L_1$, $L_2$ of the fiber 1220.

In the forward direction, the input light having a wavelength $\lambda_F$ is introduced through the fiber 1220 at $L_1$, passes through the circulator 1212 from port 1212a to port 1212b, passes through the blocking apparatus 1218 to the port 1214b of the circulator 1214, exits from the port 1214c of the circulator 1214, and then travels along the $L_2$ section of the fiber 1220. In this path, the signal light does not encounter any blocking apparatuses. The blocking apparatus 1218 is tuned to allow light having a wavelength $\lambda_F$ to pass through without blocking. In the backward direction, the Brillouin light, which was accumulated in the $L_2$ section of the fiber 1220, passes the circulator 1214 from port 1214c to port 1214a and is blocked at the blocking apparatus 1216, which is tuned to block the wavelength of the Brillouin light.

In the backward direction, input light having a wavelength $\lambda_B$ passes through the blocking apparatus 1216 via the circulator 1214 from port 1214c to port 12143a. Since the blocking apparatus wavelength is adjusted to pass only the wavelength of the input light having the wavelength $\lambda_B$, the Brillouin light from the input light $\lambda_F$ is blocked by the blocking apparatus 1216, and the light having the wavelength $\lambda_B$ goes to the $L_1$ section of the fiber 1220 via circulator 1212 (from port 1212c to port 1212a). Brillouin light from the light having the wavelength $\lambda_B$ generated in section $L_1$ travels through the circulator 1212 from port 1212a to port 1212b and encounters the blocking apparatus 1218, which is tuned to pass only light of having the wavelength $\lambda_F$, preventing the Brillouin light from passing the blocking apparatus 1218. Each of the blocking apparatuses 1216, 1218 sufficiently attenuates the Brillouin light such that the Brilluoin light is effectively discharged from the blocking system 1210.

Figure 13:
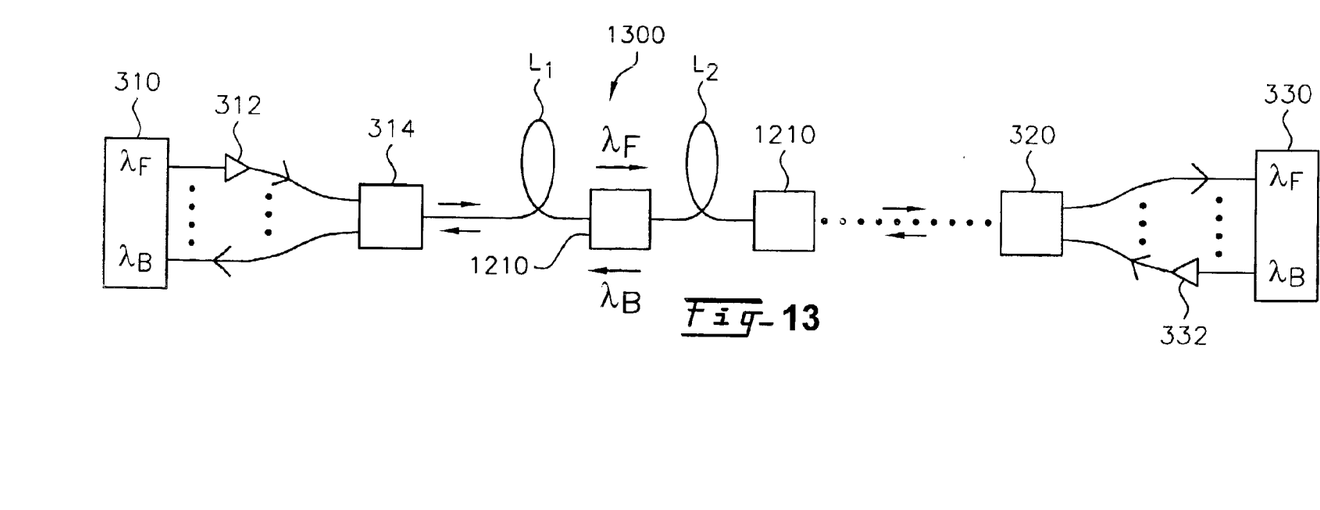
FIG. 13 shows a schematic diagram of the bi-directional wavelength division multiplexing system of FIG. 3 with the SBS suppression system of FIG. 12.

A number of these bi-directional wavelength selective blocking systems 1210 can be placed along the length of the fiber 1220. Optimization of the spacing for each direction would be calculated by the method disclosed by the present invention. The blocking system 1210 can be inserted into the system shown in FIG. 3 to form an SBS suppressed system 1300 shown in FIG. 13.

Figure 14:
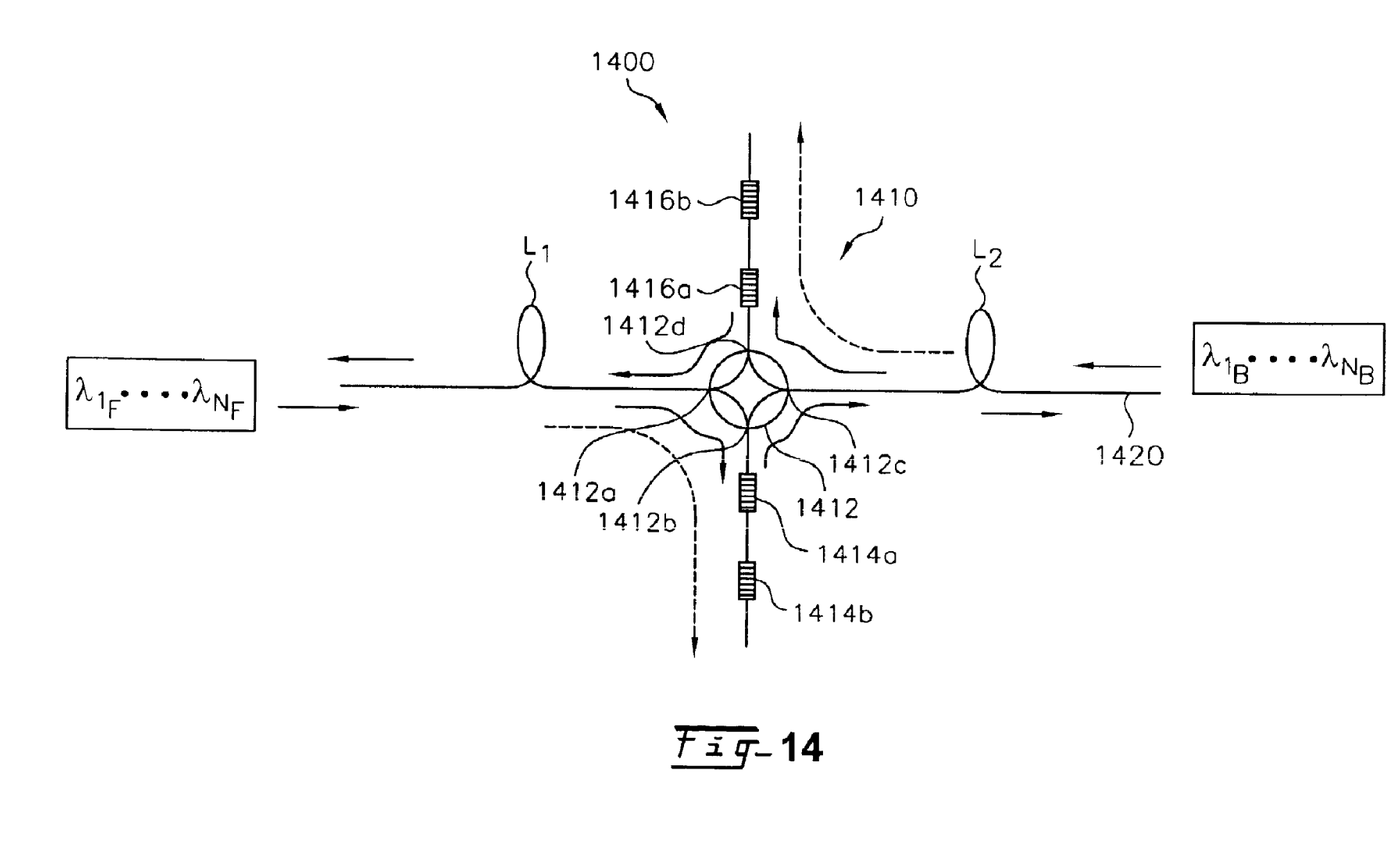
FIG. 14 shows a schematic diagram of a second alternate embodiment of the bi-directional transmission system incorporating an alternate blocking apparatus.

FIG. 14 shows an alternate embodiment of the present invention for a bi-directional system 1400. In this embodiment, a blocking system 1410 is disposed between a first length $L_1$ and a second length $L_2$ of a fiber 1420. The blocking system 1410 includes a four-way circulator 1412 between lengths $L_1$ and $L_2$, and a plurality of blocking apparatuses, 1414a, 1414b, 1416a, 1416b, such as filters or fiber gratings, as shown. The blocking system 1410 is substituted for the blocking system 1210 shown in FIG. 13.

In the forward direction, the input light of multiple wavelengths ($\lambda_{1F} \ldots \lambda_{NF}$) input at $L_1$ of the fiber 1420 passes through the circulator 1412 from port 1412a to port 1412b. Each wavelength of the light ($\lambda_{1F} \ldots \lambda_{NF}$) is reflected by the corresponding blocking apparatus 1414a, 1414b back through port 1412b where the light exits the circulator 1412 through port 1412c. Although only two of the blocking apparatus 1414a, 1414b are shown, preferably there is one blocking apparatus for each wavelength ($\lambda_{1F} \ldots \lambda_{NF}$) which is desired to be retained within the blocking system 1410.

Light having wavelengths of other than ($\lambda_{1F} \ldots \lambda_{NF}$) passes through the blocking apparatuses 1414a, 1414b without reflection and is discharged from the blocking system 1410. In the backward direction, the Brillouin light, which has a different wavelength than the input light, and which accumulated in the $L_2$ section of the fiber 1420, passes the circulator 1412 from port 1412c to port 1412d, passes through the blocking apparatuses 1416, and then discharges from the blocking system 1410.

In the backward direction, the input light of multiple wavelengths ($\lambda_{1B} \ldots \lambda_{NB}$) input at $L_2$ of the fiber 1420 passes through the circulator 1412 from port 1412c to port 1412d. Each wavelength of light ($\lambda_{1B} \ldots \lambda_{NB}$) is reflected by a corresponding blocking apparatus 1416a, 1416b back through port 1412d where the light exits the circulator 1412 through port 1412a. Although only two of each blocking apparatus 1416a, 1416b are shown, preferably, there is one blocking apparatus for each wavelength ($\lambda_{1B} \ldots \lambda_{NB}$) which is desired to be retained within the blocking system 1410.

Light having wavelengths of other than ($\lambda_{1B} \ldots \lambda_{NB}$), such as the Brillouin light from the light having the wavelengths ($\lambda_{1F} \ldots \lambda_{NF}$) as described above, passes through the blocking apparatuses 1416a, 1416b without reflection. The Brillouin light generated by the input light having wavelengths ($\lambda_{1B} \ldots \lambda_{NB}$), which has a different wavelength than the input light, and which accumulated in the $L_1$ section of the fiber 1420, passes through the circulator 1412 from port 1412a to port 1412b, passes through the blocking apparatuses 1414a, 1414b, and then discharges from the blocking system 1410. Those skilled in the art will recognize that the arrangement of the blocking apparatuses 1414a, 1414b, 1416a, 1416b can be arranged to optimize reflection of the different wavelengths $\lambda_{1F} \ldots \lambda_{NF}, \lambda_{1B} \ldots \lambda_{NB}$, respectively.

A plurality of these bi-directional wavelength selective blocking systems 1410 can be placed along the length of the fiber 1420. Optimization of the spacing would be similar to the spacing as determined by the method disclosed by the present invention for each direction.

Although a four-way circulator 1412 is preferred, those skilled in the art will recognize that four three-way circulators (not shown) can be used such that the output of each three-way circulator is connected to an input of an adjacent three-way circulator.

While the present invention in mainly directed to suppress Brillouin scattering, those skilled in the art will recognize that the present invention also suppresses Rayleigh scattering. Those skilled in the art will also recognize that, while the blocking systems 1210, 1410 can be implemented into new fiber optic systems, the blocking systems 1210, 1410 can also be retrofitted into existing fiber optic systems to reduce SBS and Rayleigh scattering and improve signal transmission in those existing systems.

It will be further appreciated by those skilled in the art that modifications could be made to the embodiments described above without departing from the broad inventive concept thereof. It is understood, therefore, that this invention is not limited to the particular embodiments disclosed but is intended to cover modifications within the spirit and scope of the present invention as defined by the appended claims.

What is claimed is:

1. A system for suppressing Brillouin scattering light in an optical fiber assembly comprising:
    an optical fiber assembly having first and second ends; and
    at least one blocking apparatus disposed along the fiber assembly between the first and second ends, wherein the at least one blocking apparatus comprises:
    a four-port optical circulator having:
        a first port disposed proximate the first fiber assembly end;
        a second port disposed proximate the second fiber assembly end;
        a third port optically disposed between the first and second ports;
        a fourth port optically disposed between the second and first ports; and
        at least one filter optically connected to each of the third and fourth ports.

* * * * *